March 14, 1961  T. W. SMITH  2,974,481
JET PIPE EJECTOR NOZZLES
Filed April 24, 1958  2 Sheets-Sheet 1

Inventor:
Thomas William Smith
By: Stevens, Davis, Miller & Mosher
Attorney

March 14, 1961 T. W. SMITH 2,974,481
JET PIPE EJECTOR NOZZLES
Filed April 24, 1958 2 Sheets-Sheet 2

Inventor:
Thomas William Smith
By
Stevens, Davis, Miller & Mosher
Attorneys

United States Patent Office 2,974,481
Patented Mar. 14, 1961

2,974,481

JET PIPE EJECTOR NOZZLES

Thomas William Smith, Ashton, Preston, England, assignor to The English Electric Company Limited, London, England, a British company Filed Apr. 24, 1958, Ser. No. 730,562

Claims priority, application Great Britain May 21, 1957

3 Claims. (Cl. 60—35.6)

The invention relates to jet pipe ejector nozzles of the kind in which secondary air is blown out between a convergent jet nozzle and the surrounding aircraft skin for the purposes of cooling and of removal of suction or negative thrust effects over the annular area between the trailing edges of the said aircraft skin and convergent jet nozzle.

This well known arrangement works satisfactorily for air breathing engines at sub-sonic speeds where the nozzle pressure ratio is low. However for air breathing engines at super-sonic speeds where the nozzle pressure ratio is high, the desired flow pattern for complete or near complete expansion of the exhaust gases cannot be achieved. Provision of a cylindrical shroud extending beyond the surrounding aircraft skin well behind the trailing edge of the convergent jet nozzle would provide a remedy at high pressure ratio but would increase the secondary air requirements for high thrust at low pressure ratio. These two conditions are accordingly mutually incompatible in this respect.

According to the present invention a retractable ejector nozzle is provided which in the retracted position for low pressure ratio conditions of the nozzle closely fits the inside of the skin surrounding the jet pipe and in the expanded position for high pressure ratio conditions of the nozzle projects with its trailing edge behind the trailing edge of the converging jet pipe.

Preferably the said ejector nozzle is composed of hinged plate segments (petals) which in the expanded position of the ejector nozzle are erected inwardly so as to form a convergent-divergent nozzle, the convergent portion thereof surrounding the convergent primary jet nozzle, and the divergent portion extending beyond the same backwardly. This divergent portion even forms a reaction surface allowing the velocity and therefore the momentum of the jet to increase thereby increasing the thrust.

The hinged plate segments (petals) may be trapezium-shaped with a slight transverse camber and with their narrow bases hinged in pairs to one another and with their wide bases hinged to a telescoped tubular member adjacent the aircraft skin. When the ejector nozzle is expanded these plate segments (petals) join one another in the form of opposite truncated cones. When it is retracted they hug the telescoped tube from inside.

The throat diameter of this convergent-divergent nozzle may be varied to suit various flight conditions by expanding the ejector nozzle rearwardly more or less.

In order that the invention may be clearly understood and readily carried into effect the same will now be described by way of example with reference to the accompanying drawings in which:

Fig. 1 is a diagrammatic longitudinal section of a conventional jet pipe ejector nozzle in a low pressure ratio condition.

Fig. 2 is a diagrammatic longitudinal section of a modified jet pipe ejector nozzle in a low pressure ratio condition, Fig. 3 is the same in a high pressure ratio condition, Fig. 4 is a diagrammatic longitudinal section of a jet pipe ejector nozzle according to the invention adjusted for low pressure ratio conditions, Fig. 5 is the same adjusted for high pressure ratio conditions, Fig. 6 is a plan view of two adjacent hinged plates forming part of the nozzle according to Figs. 6 and 7.

Figure 1:
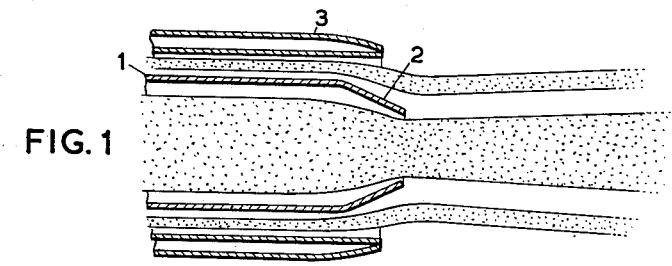

Referring firstly to Fig. 1 the inner jet pipe 1 has a convergent primary nozzle 2 and is surrounded by a double-walled outer jet pipe 3. Secondary air is blown out through the annular space between the inner jet pipe 1 and the outer jet pipe 3, the flow pattern being diagrammatically indicated for low pressure ratio conditions of the nozzle.

The secondary air flow in the annular duct between the inner jet pipe 1 and the outer jet pipe 3 constitutes a loss even at a low pressure ratio since the momentum of the secondary air entering the annular duct is reduced by friction losses and does not add materially to that of the primary jet when issuing into the outer atmosphere. At high pressure ratio conditions these losses would be prohibitive.

Figure 2:
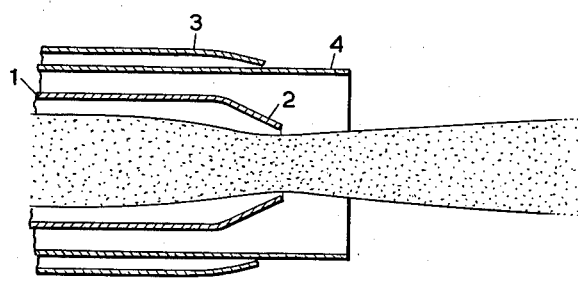
Figure 3:
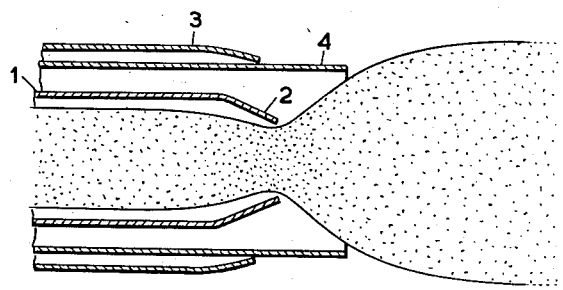

Referring now to Figs. 2 and 3, a shroud tube 4 is interposed between the outer jet pipe 3 and the primary nozzle 2, which tube extends well behind the trailing edges of the outer jet pipe 3 and primary nozzle 2. By this shroud tube 4 the exit area is increased, and the jet from the primary nozzle 2 is allowed to expand and hence to increase velocity before it contacts the ambient air in high pressure ratio conditions as shown in Fig. 3. However, in conditions as shown in Fig. 2 with low pressure ratio across the primary nozzle the arrangement of the tube 4 proves unsatisfactory in that it requires large quantities of secondary air to achieve a performance comparable with the arrangement of Fig. 1.

Figure 4:
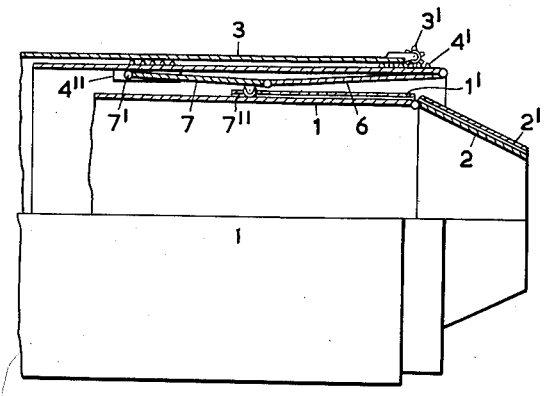
Figure 5:
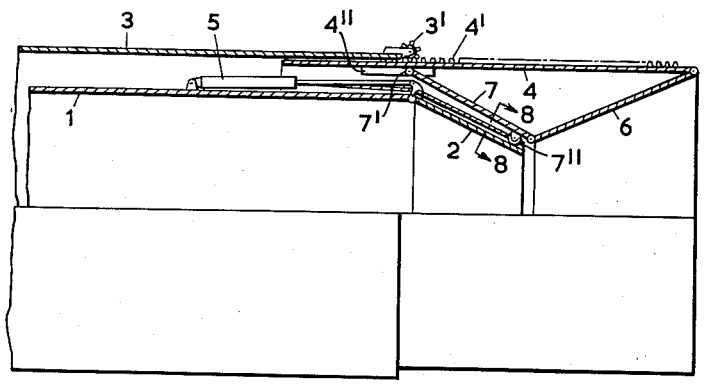
Figure 8:
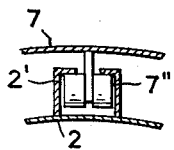
Fig. 8 is a detail in section on line 8—8 of Fig. 5 on an enlarged scale.
Figure 6:
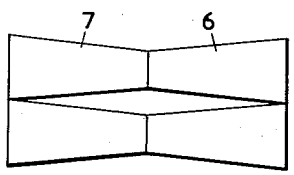

Referring now to Figs. 4 to 6, the shroud tube 4 is provided with longitudinal tooth racks 4' on its outer surface which mesh with gear pinions 3' journalled at the rear edge of the outer jet pipe 3. By rotating these pinions 3' by a common driving means (not shown) the shroud tube 4 may be moved from the retracted position of Fig. 4 into the expanded position of Fig. 5. Trapezium-shaped petals 6 and 7 are hinged to one another at their short bases (Fig. 6). The broad bases of the outer petals 6 are hinged to the trailing edge of the shroud tube 4, and the broad bases of the inner petals are guided with rollers 7' in longitudinal tracks 4" on the inside of the shroud tube 4. Rollers 7" journalled to the petals 7 near the hinges of the petals 6 and 7 are guided longitudinally in tracks 1' and 2' on the outside of the inner jet pipe 1 and primary jet nozzle 2, respectively (Fig. 8).

The primary jet nozzle 2 may also be composed of petals, and its cone angle may be adjustable by means of jacks 5 located in the secondary stream between the inner jet pipe 1 and the outer jet pipe 3.

When moving the shroud tube 4 from the retracted position of Fig. 4 (for sub-sonic or low pressure ratio flight) to the expanded position of Fig. 5 (for supersonic or high pressure ratio flight), the rollers 7" move first along the tracks 1' on the inner jet pipe and then along the tracks 2' on the primary jet nozzle 2 so that the petals 6, 7 move from their substantially flat position of Fig. 4 into the position of Fig. 5 where they form a convergent-divergent nozzle with its throat adjacent the outlet from the primary jet nozzle 2.

The cone angle of the primary jet nozzle 2 can be adjusted in the usual way by moving the petals of the latter by means of their jacks 5. The rollers 7" would follow that movement, and the petals 6, 7 would also change their cone angle, in that the hinge lines of the petals 6 would remain stationary on the shroud tube 4 while the rollers 7' on the broad bases of the petals 7 would move in their tracks 4".

Figure 7:
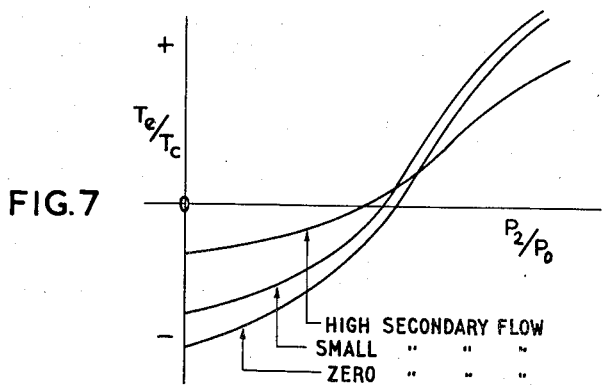
Fig. 7 is a graph plotting the ratio of ejector nozzle thrust over convergent nozzle thrust over nozzle pressure ratio for three different secondary flows.

In Fig. 7 the ratio of ejector nozzle thrust $T_e$ over the convergent nozzle thrust $T_c$ is plotted over the nozzle pressure ratio $P_2/P_0$. For an air breathing engine such as a turbo jet engine or ram jet engine this pressure ratio is low for low forward speeds and high for high forward speeds of the said engine. It will be seen that the ratio $T_e/T_c$ is negative for low pressure ratio, constituting a loss, and positive for high pressure ratios. The losses at low pressure ratios can be reduced by increasing the secondary flow, but at the price of reduced gains at high pressure ratios.

Optimum conditions can be established both for low and high pressure ratios by operating the arrangement according to Figs. 4 to 6 at low pressure ratios (with the ejector nozzle retracted as in Fig. 4) on the abscissa axis of Fig. 7 up to the intersection of the curves with the abscissa axis, and then for high pressure ratios (with the ejector nozzle extended as in Fig. 5) on the graph with a positive $T_e/T_c$, i.e. with a gain in thrust. A small secondary flow gives the best results according to Fig. 7.

While I have described herein and illustrated in the accompanying drawings what may be considered typical and particularly useful embodiments of my said invention I wish it to be understood that I do not limit myself to the particular details and dimensions described or illustrated, for obvious modifications will occur to a person skilled in the art.

What I claim as my invention and desire to secure by Letters Patent is:

1. A jet pipe ejector nozzle arrangement comprising in combination: an inner jet pipe, a convergent primary jet nozzle attached to the rear end of said inner jet pipe, an aircraft skin portion surrounding and spaced from said inner jet pipe forming an annular duct, means for blowing secondary air through said annular duct, a retractable shroud tube slidably mounted co-axially within and closely adjacent to said skin portion, and forward and aft pedal segments hinged to one another and to said shroud tube respectively, said shroud tube and petals having a retracted position for low pressure ratio conditions of said nozzle arrangement wherein said shroud tube is retracted within said skin portion and issues upstream of said primary jet nozzle and said petal segments hug said shroud tube from inside, and an expanded position for high pressure ratio conditions wherein said shroud tube projects with its trailing edge beyond the trailing edge of said convergent primary jet nozzle and said petal segments are erected inwardly of said shroud tube so as to form a convergent-divergent ejector nozzle, the convergent portion of said ejector nozzle surrounding said convergent primary jet nozzle, and the divergent portion of said ejector nozzle flaring out behind said primary jet nozzle.

2. A jet pipe ejector nozzle arrangement as claimed in claim 1, comprising in addition: longitudinal guide tracks on the inside of said shroud tube, and longitudinal guide tracks on the outside of said inner jet pipe and primary jet nozzle, said petal segments being substantially trapezium-shaped and hinged in pairs to one another on their small bases, the broad bases of the aft petal segments being hinged to the trailing edge of said shroud tube, the broad bases of the forward petal segments being guided in said tracks of said shroud tube, and the joints of said forward and aft petal segments being guided in said tracks of said inner jet pipe and primary jet nozzle.

3. A jet pipe ejector nozzle arrangement as claimed in claim 2, wherein said primary jet nozzle comprises petal segments adjustable at various cone angles, the petals of said ejector nozzle following the adjustment of said primary jet nozzle.

References Cited in the file of this patent
UNITED STATES PATENTS 2,653,445     Halford et al.            Sept. 29, 1953

FOREIGN PATENTS 772,363     Great Britain            Apr. 10, 1957